Oct. 18, 1949.  A. P. GLENNY  2,484,821
GIMBAL AND OTHER BEARINGS
Filed July 17, 1944
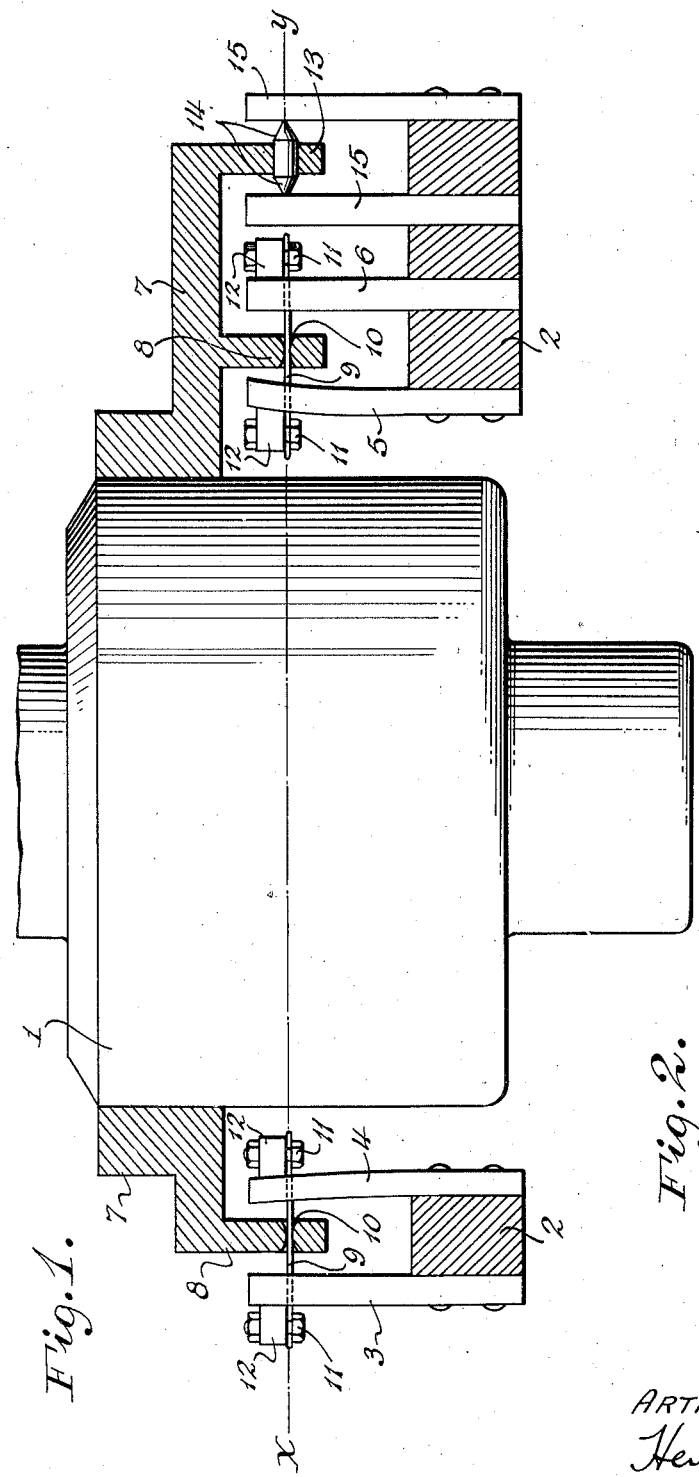
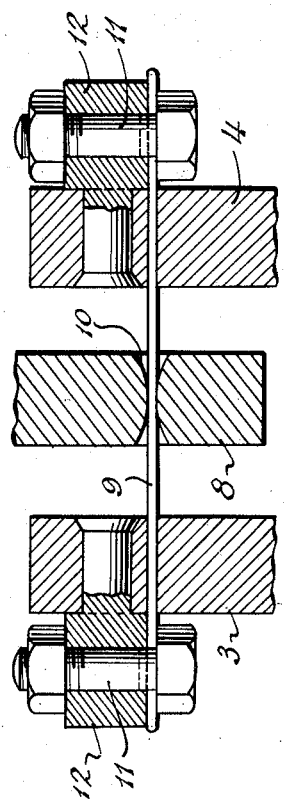
INVENTOR
ARTHUR P. GLENNY
BY Herbert H. Thompson
his ATTORNEY Patented Oct. 18, 1949

2,484,821

UNITED STATES PATENT OFFICE 2,484,821

GIMBAL AND OTHER BEARINGS

Arthur Philip Glenny, Hanworth, England, assignor to The Sperry Gyroscope Company, Ltd., Brentford, England Application July 17, 1944, Serial No. 545,242
In Great Britain July 27, 1943

9 Claims. (Cl. 308—2)

This invention relates to bearings, particularly for a gyroscope rotor-case in its gimbal ring, or for the latter in its instrument case or other support, and applicable also to miscellaneous other oscillatory elements, and also to rotary elements. For convenience of description the oscillatory or rotary element will be referred to herein as the rotor or rotor case.

The invention has for its object to provide a satisfactory bearing of low friction wherein vulnerability to deterioration and damage by shocks is reduced to a minimum. A more specific object is to avoid the "ratcheting" action which sometimes develops in ball bearings of gyroscopic and other instruments due to misalignment or other causes. Such ratcheting, in a gyroscopic instrument, brings in its train precessional errors on account of the friction torque being greater in one direction than in the other.

According to the invention a bearing for mounting a member for oscillatory or pivotal movement about an axis relative to a supporting member comprises a flexible element, such as a wire, mounted on one member and maintained under tension thereon, to constitute the axle for the said movement, and journalled in the other member, said flexible element constituting the sole surface imposing friction opposing rotation. While the rotor may turn on an axle passing completely through it there is hereinafter described a preferred arrangement having two such bearings, one on each side of the rotor when the mounting of the latter is trunnion-wise. The flexible element is advantageously a piano wire (e. g. of 25 gauge) when the invention is applied to the rotor case or gimbal bearings of gyroscopic instruments.

The tensioned flexible element of the invention may be in the nature of a live axle carried on the rotor, or a dead axle carried by the surrounding structure in relation to which the rotor turns or oscillates.

In order that the invention may be readily understood reference is directed to the following detailed description aided by the accompanying drawings, wherein:

Figure 1 is a partly sectioned diagram showing the invention applied to the mounting of a gyroscope rotor case in its gimbal ring, and Figure 2 is an enlarged sectional view of the left-hand bearing seen in Figure 1.

In the drawings, the rotor case is indicated generally by the numeral 1 and this is mounted to oscillate in the gimbal ring 2 by co-axial bearings located on each side of the rotor. The gimbal ring 2 is furnished with two pairs of spaced trunnion lugs 3, 4 and 5, 6 one pair on each side, the two pairs being diametrically opposite one another and spaced apart in the direction of the axis $x$—$y$ of the rotor case 1. These legs are later referred to as the gimbal lugs for the sake of brevity. The rotor case 1 is furnished with arms 7 at two diametrically opposite points, and these arms are each formed or furnished with a bearing lug 8 extending in a direction normal to the axis $x$—$y$, i. e. parallel to the trunnion lugs 3, 4 and 5, 6. The rotor-case lugs 8 extend into the space between the aforesaid pairs of trunnion lugs respectively. The tensioned flexible element of the invention is constituted by a wire 9 which is disposed coaxially with the axis $x$—$y$ and which extends between the trunnion lugs and passes through a bore 10 in the rotor-case lug 8. It will be seen that each lug 8 is mounted with considerable clearance from the respective pairs of trunnion lugs 3, 4 and 5, 6 and the length of the wire in the journal bore 10 is short in comparison with the length of wire stretching between the trunnion lugs. Thus apart from the comparatively negligible friction at the pin-point bearings 14, described later, the flexible element 9 constitutes the sole surface imposing friction on the movement of the trunnion lug 8.

The said flexible wire 9 is secured at its ends to the respective trunnion lugs by clamping studs 11 mounted in supports 12 fixed to the trunnion lugs, and one of the latter is furnished with or formed as means for tensioning the wire. In the example depicted, the lugs 4 and 5 themselves are spring blades normally stressed to maintain the wire 9 in a taut condition. The bore 10 through each rotor-case lug 8 is conically or spherically flared at its mouths as more clearly seen in Figure 2. By this means, the area of contact with the wire is reduced and also a self-aligning bearing is produced so that even though the bearings on the two sides of the gyroscope are not carefully aligned no binding will result. Also, different rates of expansion of the rotor-case and the supporting members can not result in binding of the bearings.

Associated with one of the improved trunnion mountings is a means for locating the rotor casing endwise on its axis $x$—$y$. For example a second or locating lug 13 may be employed on the rotor case arm 7 spaced from and parallel to the adjacent rotor case bearing lug 8. The axial locating bearings 13, 14 are preferably both placed on the same side of the rotor-case, thereby avoiding binding due to temperature changes. This locating lug 13 is provided with a pair of co-axial pin-point bearings 14, one projecting on each side of the locating lug 13, and these points take between a pair of locating elements in the form of stiff blade springs 15 rigidly mounted on and projecting from the gimbal ring 2. These point bearings are disposed on the axis $x-y$. Any other suitable type of axial locating bearing may be used in place of the pin-point bearing described, e. g. one comprising a ball housed in and projecting each side of the said locating lug, and mounted in suitable bearing recesses in the aforesaid stiff blade springs 15.

I claim:

1. A bearing for mounting a member for free oscillatory or pivotal movement about an axis in a supporting member, comprising a flexible small diameter element such as a wire, spaced tension means on one of said members supporting said wire in tension between said means, a bearing trunnion supported on the other of said members through which said wire freely extends to journal said first member for freedom about said axis, said wire and trunnion constituting the sole support and sole bearing for at least one side of said member.

2. A bearing for mounting a member as claimed in claim 1, in which the length of the bearing is short compared to the length of the wire.

3. Bearings for mounting a member for free oscillatory or pivotal movement about an axis relative to a supporting member, comprising a wire on each side of said member, spaced tension means fixed to the supporting member on each side of the oscillatory member and supporting said wires under tension, and trunnions on each side of said member through which each wire freely passes forming a journal support.

4. Bearings for mounting a member as claimed in claim 3, having a separate double-acting thrust-bearing at one side of the oscillatory member only.

5. Bearings for mounting a pivotal member in a supporting member comprising in combination two pairs of spaced trunnion lugs, a first pair being furnished on one side of the supporting member and the other pair being furnished diametrically opposite said first pair and spaced apart in the direction of the pivot axis of the pivotal member, a pair of lugs one being carried at one side of the pivotal member and the other being carried on an opposite side of the pivotal member and each adapted to extend between one of the pairs of said trunnion lugs, and a tensioned, flexible axle fixedly mounted between each pair of trunnion lugs and passing through a bore in the associated pivotal member lug.

6. Bearings as claimed in claim 5, one of the trunnion lugs being a resilient member and normally stressed to maintain the flexible axle under tension.

7. Bearings as claimed in claim 5, in which the pivotal member is adapted to turn about the tensioned flexible axle by means of a bore in a part of said pivotal member, said bore being flared at its mouth.

8. Bearings according to claim 5, in which means are combined for locating the pivotal member endwise on its axis of rotation.

9. Bearings according to claim 5, in which an extra lug is carried on one side of the pivotal member and is provided with a pair of coaxial oppositely directed pin-point bearings disposed on the axis of rotation of the pivotal member, and in combination therewith a pair of locating elements mounted on the supporting member in such a position that the point bearings are disposed therebetween, and take a bearing therein so as to prevent endwise movement of the pivotal member.

ARTHUR PHILIP GLENNY.

REFERENCES CITED

The following references are of record in the file of this patent:

UNITED STATES PATENTS

| Number | Name | Date |
|---|---|---|
| 2,229,645 | Esval et al. | Jan. 28, 1941 |
| 2,253,119 | Goerth | Aug. 19, 1941 |
| 2,322,108 | Best | June 15, 1943 |